United States Patent
Narayanan et al.

(10) Patent No.: US 10,503,493 B2
(45) Date of Patent: Dec. 10, 2019

(54) DISTRIBUTED VERSIONING OF APPLICATIONS USING CLOUD-BASED SYSTEMS

(71) Applicant: Oracle International Corporation, Redwood Shores, CA (US)

(72) Inventors: Biju Narayanan, Kerala (IN); Deepankar Narayanan, Kerala (IN); Christudoss Irwin Tagore, Bangalore (IN); Nagendra Krishnappa, Bangalore (IN); Ravi Shankar, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 14 days.

(21) Appl. No.: 15/707,929

(22) Filed: Sep. 18, 2017

(65) Prior Publication Data
US 2018/0336027 A1    Nov. 22, 2018

Related U.S. Application Data

(60) Provisional application No. 62/507,086, filed on May 16, 2017.

(51) Int. Cl.
*G06F 9/44* (2018.01)
*G06F 8/658* (2018.01)
(Continued)

(52) U.S. Cl.
CPC .............. *G06F 8/658* (2018.02); *G06F 8/60* (2013.01); *G06F 8/61* (2013.01); *G06F 8/71* (2013.01);
(Continued)

(58) Field of Classification Search
None
See application file for complete search history.

(56) References Cited

U.S. PATENT DOCUMENTS 9,665,358 B2 *   5/2017   Nagaraja ................... G06F 8/60
2009/0300151 A1 * 12/2009   Friedman ............. G06F 11/3664
                                                                         709/222
(Continued)

FOREIGN PATENT DOCUMENTS

EP           3128418          2/2017

OTHER PUBLICATIONS

Anonymous, Clone, Clone to Template and Convert to Template, VMware Communities, Available on Internet at URL: https://communities.vmware.com/thread/83346, Accessed on Jul. 19, 2018, 3 pages.
(Continued)

*Primary Examiner* — Insun Kang
(74) *Attorney, Agent, or Firm* — Kilpatrick Townsend & Stockton, LLP

(57) ABSTRACT

The present disclosure relates to exporting local applications to cloud systems and provisioning the exported application on the cloud systems. Additionally, templates can be generated for the provisioned application, and each template can be individually customized and deployed to a destination as an application environment with a defined topology. Rapidly and dynamically generating deployable templates of provisioned applications enables cloud-based distributed versioning of the applications.

20 Claims, 14 Drawing Sheets

(51) Int. Cl.
  *G06F 8/61* (2018.01)
  *H04L 12/24* (2006.01)
  *G06F 8/60* (2018.01)
  *G06F 9/455* (2018.01)
  *G06F 9/50* (2006.01)
  *G06F 8/71* (2018.01)

(52) U.S. Cl.
  CPC ........ *G06F 9/45558* (2013.01); *G06F 9/5072* (2013.01); *H04L 41/082* (2013.01); *H04L 41/0846* (2013.01); *H04L 41/5048* (2013.01); *G06F 2009/45562* (2013.01); *G06F 2009/45591* (2013.01); *H04L 41/0893* (2013.01); *H04L 41/50* (2013.01); *H04L 41/5054* (2013.01); *H04L 41/5096* (2013.01)

(56) References Cited

U.S. PATENT DOCUMENTS

| | | | | |
|---|---|---|---|---|
| 2011/0126207 | A1* | 5/2011 | Wipfel | H04L 9/3213 718/104 |
| 2012/0102486 | A1 | 4/2012 | Yendluri | |
| 2013/0232463 | A1* | 9/2013 | Nagaraja | G06F 8/61 717/101 |
| 2013/0232480 | A1* | 9/2013 | Winterfeldt | G06F 8/60 717/177 |
| 2013/0283364 | A1* | 10/2013 | Chang | H04L 49/70 726/12 |
| 2013/0297922 | A1* | 11/2013 | Friedman | G06F 8/63 713/2 |
| 2014/0201725 | A1* | 7/2014 | Tian | G06F 8/63 717/169 |
| 2015/0178110 | A1* | 6/2015 | Li | G06F 9/45558 718/1 |
| 2015/0242204 | A1* | 8/2015 | Hassine | H04L 67/00 717/121 |
| 2015/0378700 | A1* | 12/2015 | Rachamadugu | G06F 8/60 717/120 |
| 2015/0378703 | A1* | 12/2015 | Govindaraju | G06F 8/60 717/174 |
| 2015/0378708 | A1* | 12/2015 | Nagaraja | G06F 8/60 717/177 |
| 2016/0036725 | A1 | 2/2016 | Syed et al. | |
| 2016/0110183 | A1* | 4/2016 | Fu | G06F 8/65 717/169 |
| 2016/0253170 | A1* | 9/2016 | Fardig | G06F 8/658 717/170 |
| 2017/0168797 | A1* | 6/2017 | Pogrebinsky | G06F 8/65 |
| 2017/0177662 | A1 | 6/2017 | Lam et al. | |
| 2018/0164965 | A1* | 6/2018 | Chen | G06F 9/451 |
| 2018/0165122 | A1* | 6/2018 | Dobrev | G06F 8/60 |
| 2018/0176252 | A1* | 6/2018 | Nimmagadda | H04L 63/20 |

OTHER PUBLICATIONS

International Application No. PCT/US2018/032771, International Search Report and Written Opinion dated Jul. 27, 2018, 12 pages.

Appzero, "AppZero is the Fastest and Most Flexible Way to Move Server Applications to and Across Any Clouds or Datacenter Servers-With no Code Change and Zero Lock-in", AppZero, Copyright 2013, 1 pages, retrieved on Dec. 22, 2017 from http://www.centricsystem.com.br/wpcontent/uploads/2014/01/Datasheet1.pdf.

Appzero, "Moving Enterprise Apps to the Cloud", AppZero, Cloud migration: enterprise apps on the move, Copyright 2013, 9 pages, retrieved on Dec. 22, 2017 from http://ww1.prweb.com/prfiles/2013/06/09/10815833/appzero_cloud_migration_whitepaper%202013.pdf.

Zhu, Yangpeng, "A Platform for Changing Legacy Application to Multi-tenant Model", International Journal of Multimedia and Ubiquitous Engineering, vol. 9, No. 8, 2014, pp. 407-418. http://dc.doi.org/10.14257/ijmue.2014.9.9.38.

\* cited by examiner

DISTRIBUTED VERSIONING OF APPLICATIONS USING CLOUD-BASED SYSTEMS

TECHNICAL FIELD

The present disclosure relates to exporting local applications to cloud systems and creating templates of the exported applications to be customized for different uses. More particularly, the present disclosure relates to templatizing application deployment with application-layer customizations in the cloud systems.

BACKGROUND

Cloud-based applications have become increasingly popular due to their scalability. Systems that host local applications (e.g., applications hosted and managed on premises and not on a cloud network) may benefit from developing cloud-based applications. However, it is difficult to export local applications to the cloud due to the complexity of today's applications. For instance, local applications may be hosted by a limited number of servers, whereas, a cloud network may use an unlimited number of virtual machines with a complex network topology to run applications. As a result, companies who do export their local applications to cloud networks often lose customized configurations and have to reconfigure their previously-defined customization settings to run the applications on the cloud networks.

SUMMARY

Certain aspects and features of the present disclosure relate to systems and methods for exporting local applications (e.g., applications that are not hosted on a cloud network) to distributed cloud systems while maintaining the local applications' existing configuration and/or customization settings. For example, a local application may be executed using a database server that stores and runs binary application code and/or application-layer customization settings specific to the local application. Examples of customization settings of an application can include the topology of the application (e.g., the number of nodes associated with database servers, application servers, web servers, etc.), middle tier configuration settings, middleware configuration settings, and other suitable configuration settings. In certain embodiments, exporting the local application may include serializing the local application into a deployment package (e.g., deployment data in a format that enables the application to be deployable on a cloud network) and storing the deployment package in a cloud storage system (e.g., a repository in the cloud network that stores all application versions, including the middleware, patches and versions of a particular local application). In some examples, serializing the local application may include extracting metadata associated with the local application and transforming the extracted metadata into a deployment package that can be stored in a cloud storage system. Examples of metadata associated with the local application include, but are not limited to, the version of the local application, the version of tools installed in the local application, customization settings specific to the local application (e.g., settings that indicate whether the database server, web server, and middleware of the local application run on a single server or are individually distributed on several servers), any data generated or arising out of executing the local application (e.g., user data generated from running the local application), and other suitable metadata. Advantageously, serializing the local application into one or more deployment packages and storing the deployment packages in the cloud storage system enables the local application to be cloned (e.g., backed up) on a cloud network without disrupting the existing runtime environment of the local application.

Additionally, once the local application has been exported to the cloud network and stored in the cloud storage system, certain aspects and features of the present disclosure provide an interface that enables users to provision the application on the cloud network and create multiple versions (e.g., customizable templates) of the exported application for deployment in a cloud-based infrastructure. In some implementations, a template may be a blueprint of an application. The blueprint of the application may define the compute nodes and servers running on nodes of the network. For example, the interface enables users to create multiple templates of the local application, which has been exported to the cloud and stored in the cloud storage system, for the purpose of modifying and/or updating the application for various uses (e.g., adding and/or testing new features in the application, running the application in a development environment, running the application in a production environment, and so on). In some examples, after the deployment package(s) of the local application are deployed in the cloud storage system, the interface provides users with the option to clone the application to generate one or more templates of the deployed application. For example, cloning the deployed application generates a template of the running environment of the application. A template may refer to a version of the application (e.g., a clone of the application with a new feature or fixed bug). Multiple templates of the application can be generated, and each of the templates may be customized differently from others. Further, each generated template can be separately stored in the cloud storage system and cloned to generate additional templates. Advantageously, developers may modify and customize configuration settings of a template and separately store each template in a repository as a version of the application. The template may be deployed with the customized configuration settings associated with that particular template (e.g., an instance of the application with the customized configuration settings may be executed). To illustrate, a first template of the application may be generated for use in a development environment and may be configured to run on a single server (e.g., the database server, web server, and middleware each run on a single server), whereas, a second template of the same application may be generated for use in a production environment and may be configured in a more distributed manner, in which the database server runs on a server, the web server runs on a different server, and the middleware of the application is stored on another different server. Advantageously, the templates enable applications to be highly scalable and customizable for different environments (e.g., production, demo, training, etc.).

As non-limiting example, a user may operate a local system running local application. Using an interface, the user can "lift-and-shift" the local application from the local system to a cloud-based network architecture without disrupting the execution of the local application running on the local system. For example, the user can access a cloud manager application to export the local application to the cloud system. Specifically, the user can log into the cloud manager application, which can present an interface configured to receive instructions from the user to export the local application from the local system to the cloud system. In some implementations, the user can download a utility application (e.g., export application) from the cloud manager application. For example, the utility application for performing the "lift-and-shift" operation may be downloaded as a .zip file and triggered by the user. Once triggered, the utility application can be configured to discover the underlying architecture and configuration settings of the local application running on the local system (e.g., app_home and cust_home). For example, the utility application can automatically extract infrastructure and software details of the local application, and export the local application with the customization configuration settings intact. The user can point the utility application to the local application (e.g., input a network location of one or more databases that run the local application). In response to pointing the utility application to the local application at the local system, a set of commands can be executed. The set of commands, once executed, can serialize the local application and generate one or more deployment packages that stores the application and any application-layer customization settings in a particular format. The deployment packages may include a serialized configuration file with metadata representing the local application (e.g., the configuration file can point to where the middle tier is running and export the configurations of the middle tier). Further, the deployment packages (e.g., .zip files) may include all of the configuration settings of the local application. The deployment packages can be transmitted from the local system to the cloud system and stored in a repository within the cloud system. The cloud manager application can be configured to then create a new environment for the local application based on the configuration settings included in the deployment packages. For example, the new environment can be configured to mirror the topology of the local application when it was running on the local system. As another example, the cloud manager application can be configured to enable the user to define a new topology for the local application on the cloud.

When the deployment packages are stored in the repository, the user can log into the cloud manager and perform a "shift operation." In the shift operation, the exported database of the local system can be identified using the deployment packages. Further, the user can create a new running environment of the application based on the deployment packages, and the application can be deployed on the cloud system. Deploying the application can include creating a compute node where the database would be installed, applying the configuration settings to the databases in the cloud system, and generating the middle tier for the application. For example, the middle tier includes the application tier and the web tier. Additionally, the cloud manager can perform certain health checks and verifications to ensure that the databases and middle tiers are operating properly.

Continuing with the example above, as part of ongoing development, the user may modify the application on the cloud system. For example, the user may update the application, patch bugs detected in the application code, and/or add new features to the application. The cloud manager enables the user to create a template of the application with software changes, configuration changes, deployment changes, etc., and store the template as a new version of the application in the repository of the cloud system. Each template may be customized differently from other templates of the same application, and as such, may be labeled as a different version of the application. The application may be provided as a unit to be deployed to other user groups within the cloud system. For example, a template of the application can be generated and customized to include a new feature, and then deployed in a production environment. In some implementations, when the deployment package of the application is stored in the repository, the application can be provisioned in the cloud system using a defined topology and a template. Provisioning an application in the cloud system may include deploying a complete application environment with a defined topology, template, and one or more deployment packages.

In some implementations, the user can create a base application version in the form of a template that can be used to deploy an application environment in the cloud system. The base application version can include infrastructure layout details of the application, such as number of virtual machines, details for each virtual machine (e.g., CPU, memory storage space, disk space, network configurations, etc.). Further, the base application version can include software versions for the application server, web server, and database. The base application version can also include version details of the Operating System, system configurations, and application configuration settings. Thus, the base application version (e.g., a template) may include all of the necessary infrastructure and software requirements (including system and application configuration details) to deploy the application on the cloud system. The application can be updated and the updated application can be applied or incorporated into a template.

In certain embodiments, a computer-implemented method may be provided. The method may include receiving, at a cloud system, a request for an export application from a local system. The export application may be configured to export a local application stored at the local system to the cloud system. The local application may be defined by one or more configuration settings stored at the local system. The method may also include transmitting the export application to the local system, such that the transmitting the export application facilitates execution of the export application at the local system. Execution of the export application may include: discovering application data stored at the local system, the application data being associated with the local application, wherein the application data includes the one or more configuration settings that correspond to the local application, and transforming the application data into deployment data having an exportable format. The method may include receiving, at the cloud system and from the local system, the deployment data, and defining a new environment for the local application in the cloud system. The new environment may be defined using the one or more configuration settings included in the deployment data, and the new environment may be configured to provision the local application on the cloud system. One or more templates of the new environment may be generated. Each template of the one or more templates may be a deployable version of the local application, and each of the one or more templates may be separately modifiable to include one or more modifications to the one or more configuration settings of the local application.

In certain embodiments, a system may be provided. The system may include one or more data processors, and a non-transitory computer-readable storage medium containing instructions which, when executed on the one or more data processors, cause the one or more data processors to perform the method(s) described above and herein. Additionally, a computer-program product tangibly embodied in a non-transitory machine-readable storage medium, including instructions configured to cause a data processing apparatus to perform the method(s) described above and herein may be provided.

Advantageously, users can make modifications to applications that are deployed in a cloud system, and after making the modifications, the users can then generate templates of the updated application environment to distribute to other users for further modifications. Further, a template can be used for provisioning the application in different network deployments, such as virtual machines, database-as-a-service, platform-as-a-service, and so on.

BRIEF DESCRIPTION OF THE DRAWINGS

The specification makes reference to the following appended figures, in which use of like reference numerals in different figures is intended to illustrate like or analogous components.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records" or "messages", without intent to limit the scope of the invention to any particular format for the data.

Figure 1A:
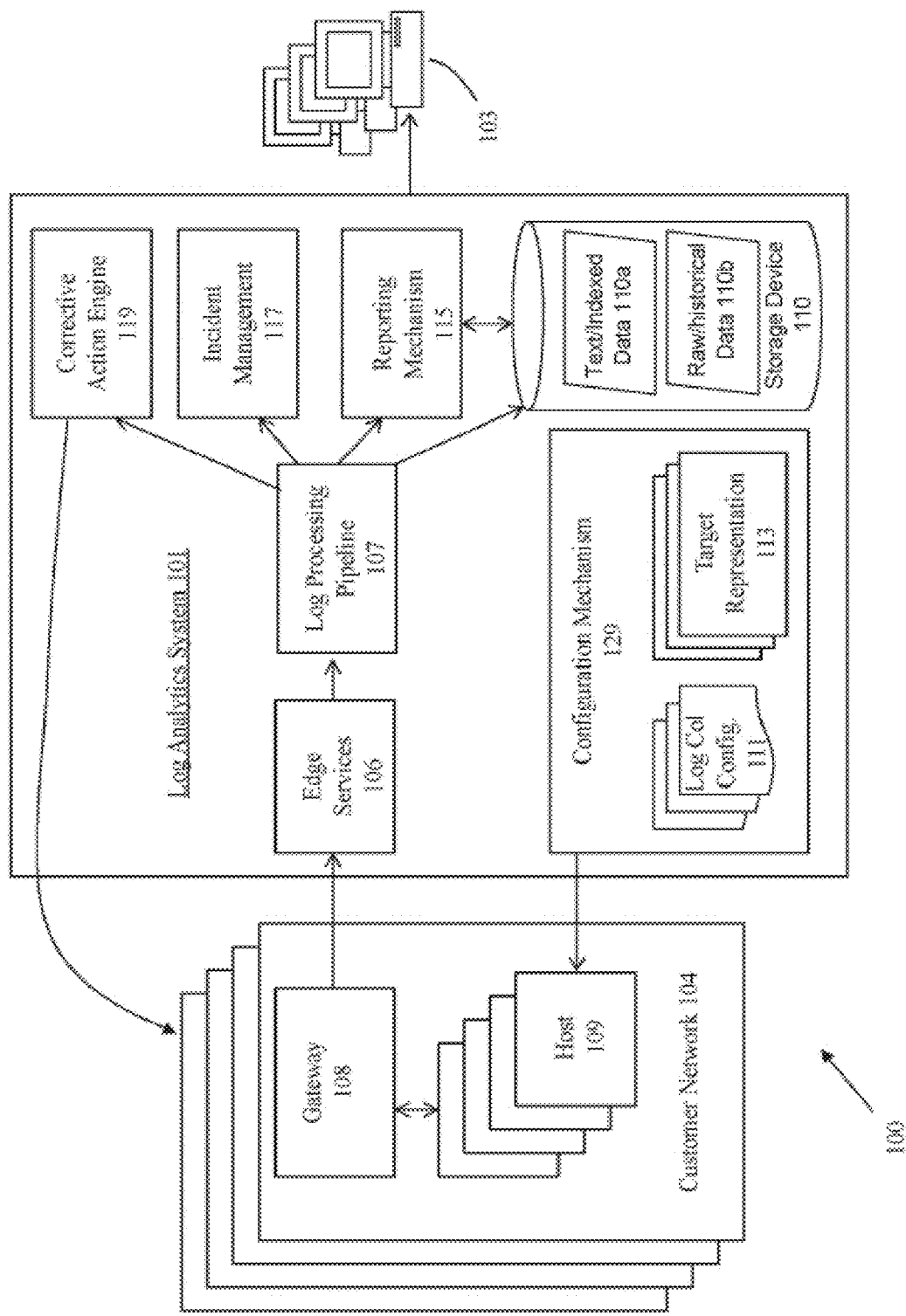
FIG. 1A illustrates an example system for configuring, collecting, and analyzing log data according to some embodiments of the present disclosure.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
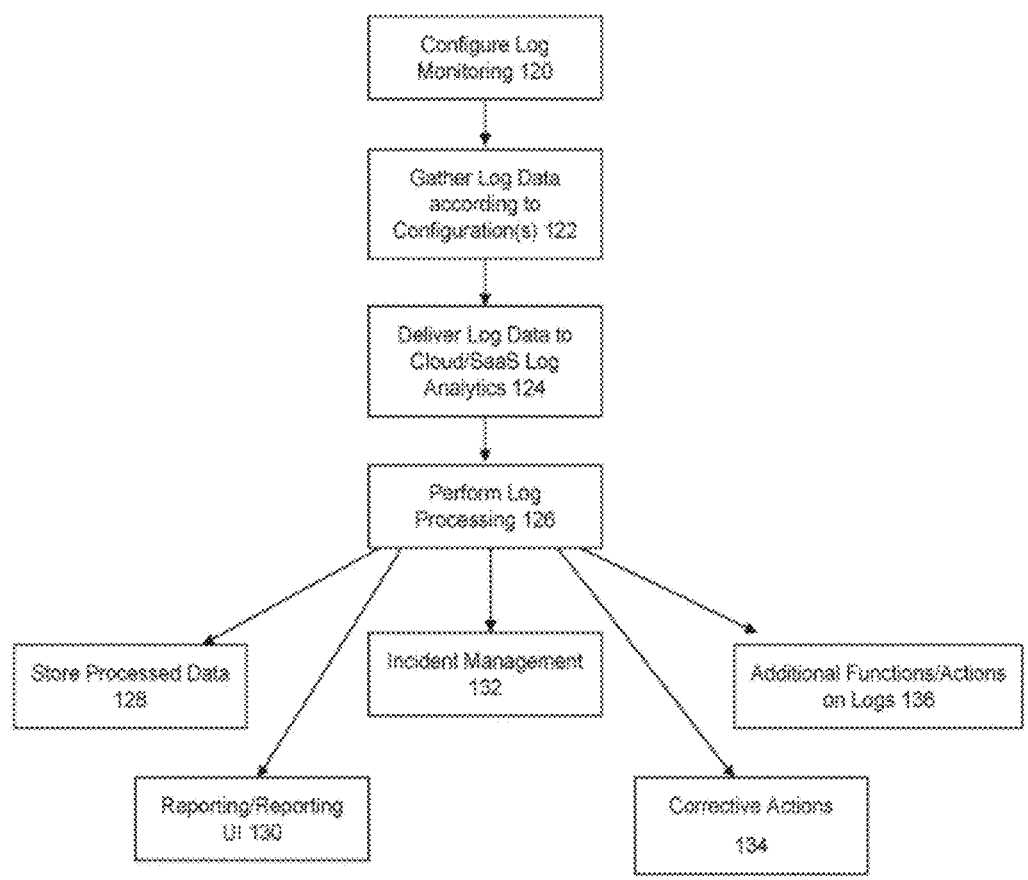
FIG. 1B illustrates a flowchart of an approach to use a system to configure, collect, and analyze log data.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include customer-defined/customer-customized rules.

The target representations 113 identify "targets", which are individual components within the customer environment that that contain and/or produce logs. These targets are associated with specific components/hosts in the customer environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering.

At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

A SOLR cluster corresponds to an Apache™ open source local search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
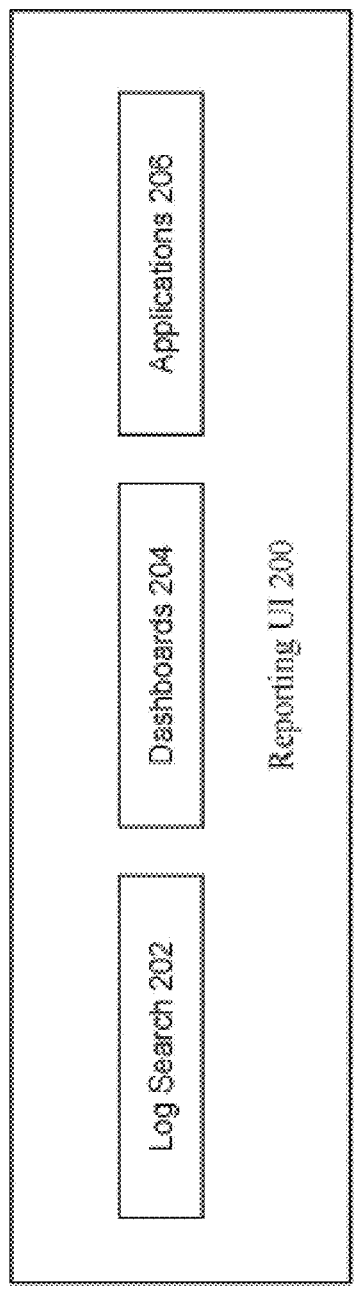
FIG. 2 illustrates an example of a reporting user interface.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
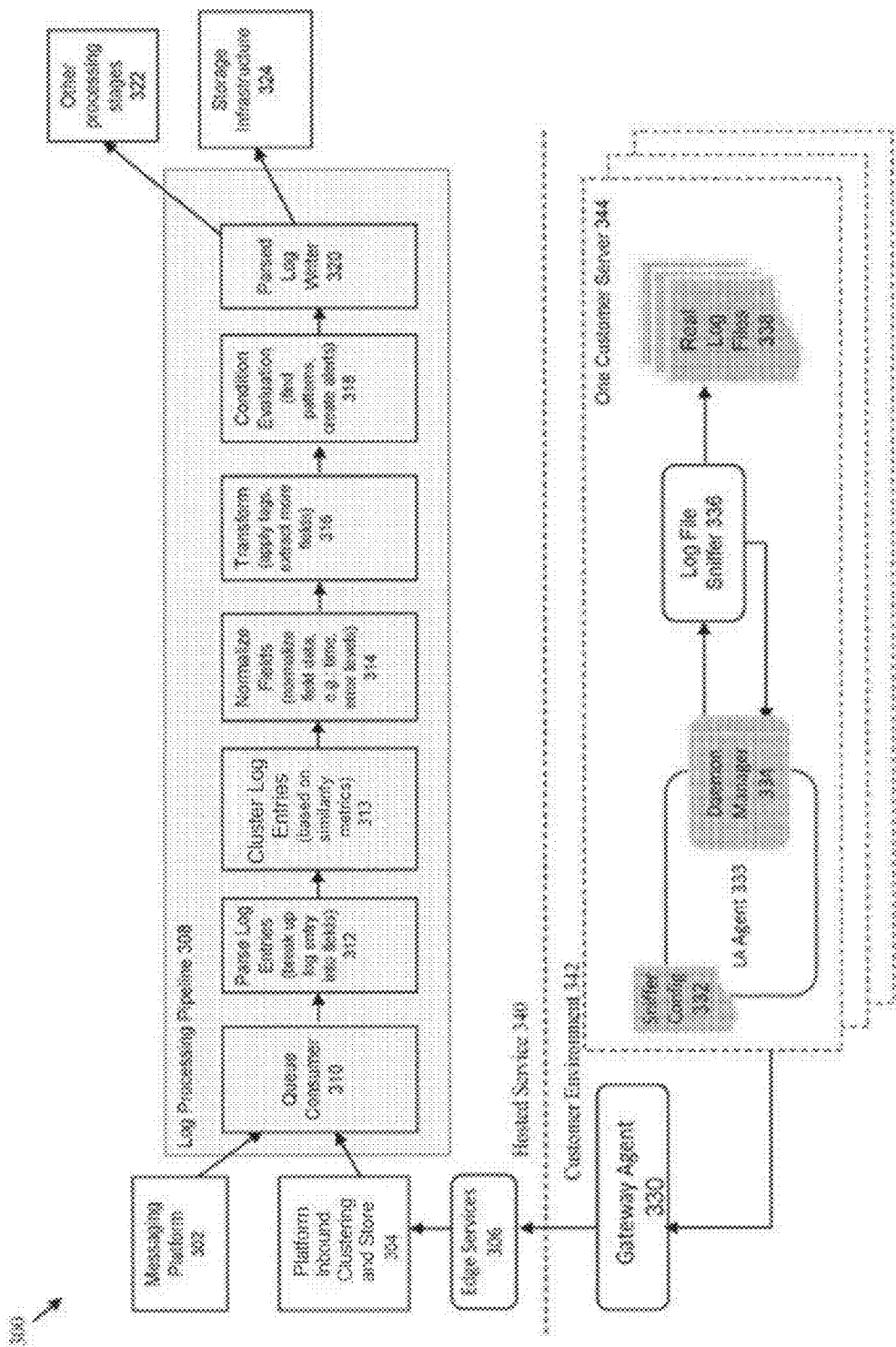
FIGS. 3A-3C are flow diagrams illustrating the internal structure of the log analytics system at a host environment.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data can be immediately processed to assign each log message to an initial cluster and stored into an inbound data storage device 304 (the "platform inbound clustering store"). In some instances, an initial or preliminary processing may be performed at an ingest time, which can include a time corresponding to (e.g., before, shortly or immediately after, or concurrent with) storage of the data. The initial or preliminary processing may include (for example) detecting which parts of the data are non-variable components and determining an initial cluster for each log message based on the non-variable components detected in the message. For example, a hashing technique may be applied to a value of each non-variable component to generate an identifier of the initial cluster. The log message may then be stored in association with the identifier of the initial cluster or other cluster data can be stored to indicate that the log message is associated with the initial cluster. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields or components. The "log type" configured for the log specifies how to break up the log entry into the desired fields.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case un-abbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
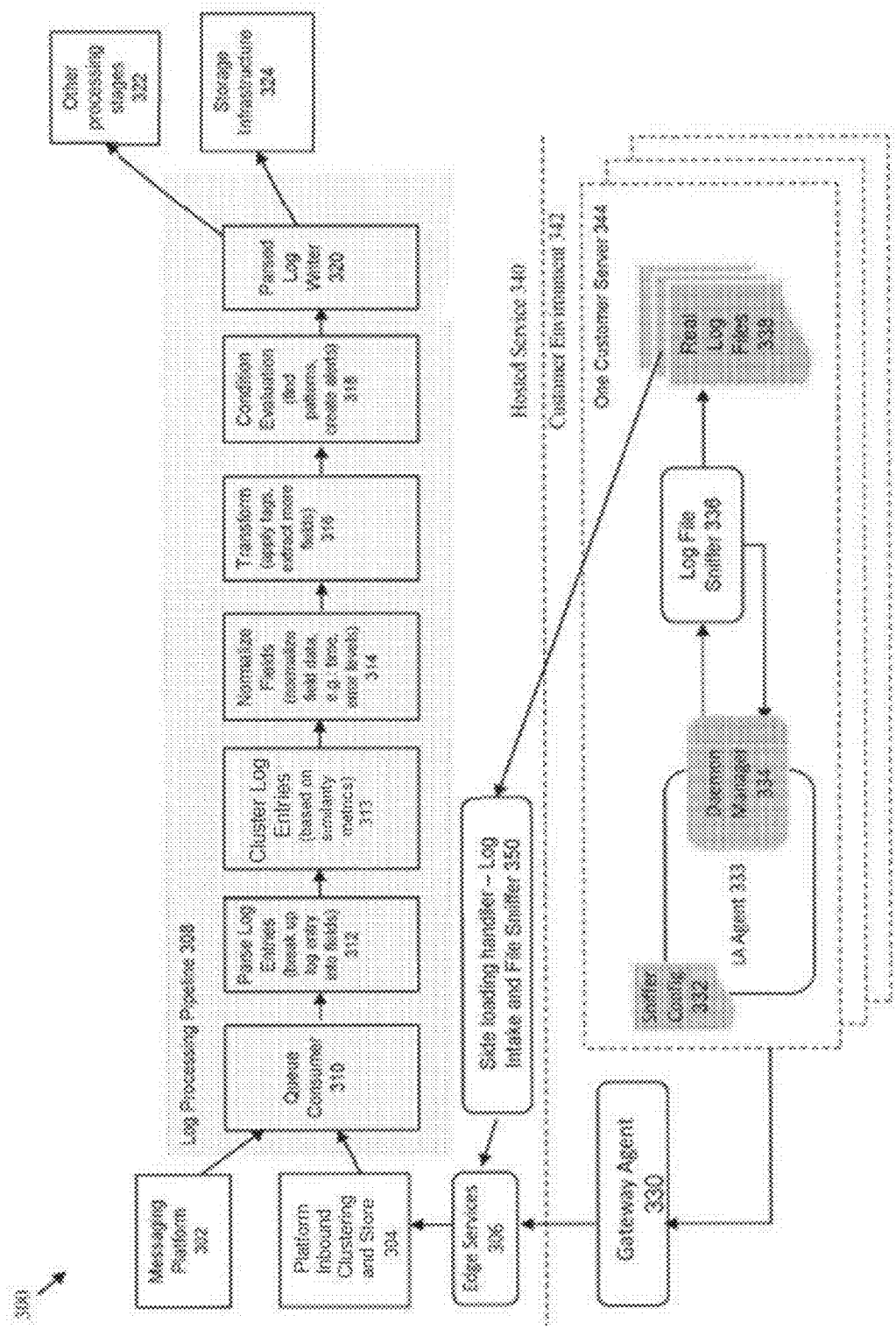
Figure 3C:
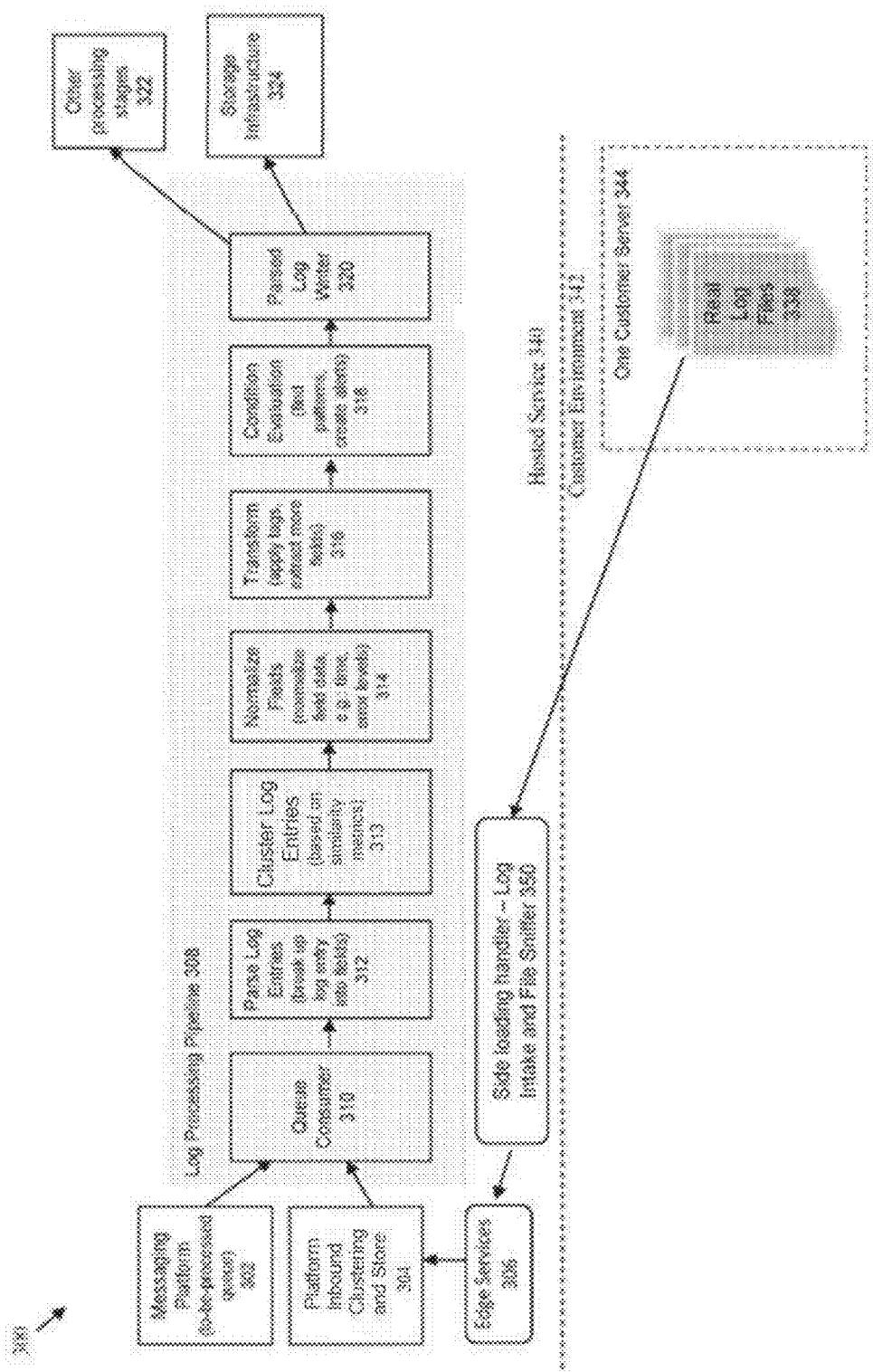

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

According to aspects of the present disclosure, many business applications have transactional flows (e.g., a flow of one or more stages of a transaction). The flow may be identified using a flow key (e.g., a transaction ID) or any other field present in a log file. The flow key can be used to connect different records and to identify the steps involved in a particular transaction. This feature facilitates the determination of which transaction IDs correspond to a failed operation in the flow in a particular time interval.

Figure 4:
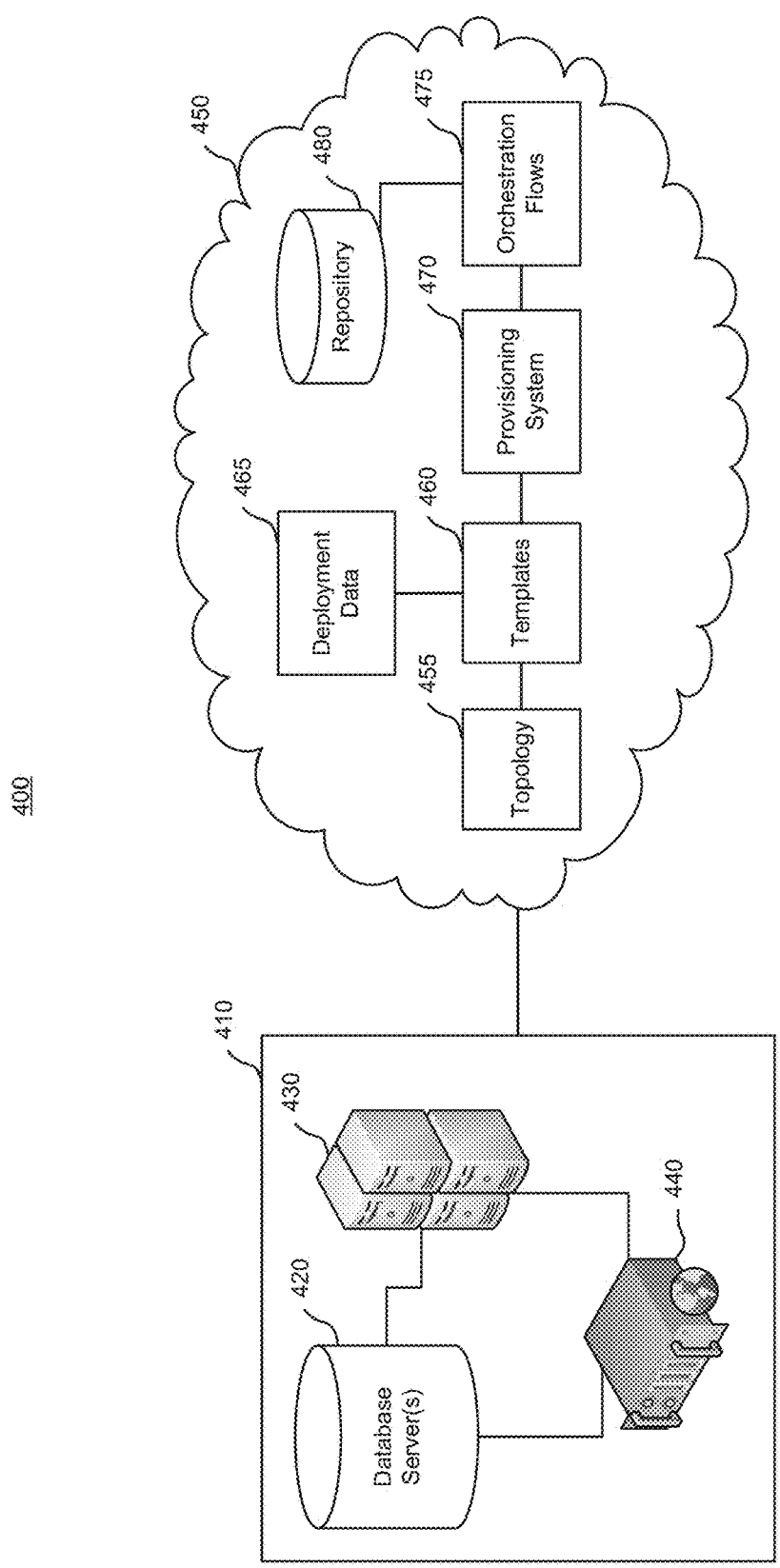
FIG. 4 is a block diagram illustrating an example network environment.

FIG. 4 shows an example network environment 400 for exporting local applications to cloud systems. Network environment 400 can include local system 410 and cloud system 450. Local system 410 can include one or more internal subsystems, such as database server(s) 420, application server(s) 430, and web server(s) 440. For example, database server 420 can store the data files associated with the local application, application server 430 can store the application code of the local application, and web server 440 can store the web code of the local application. Further, local system 410 may be associated with an entity (e.g., a company). Each of the internal subsystems of local system 410 may not be included in a cloud system or distributed within a cloud network. In some implementations, the physical components of the database servers 420, application servers 430, and the web servers 440 may be on-premises at a facility associated with the entity. Each of database servers 420, application servers 430, and web servers 440 can, at least in part, execute the local application.

It will be appreciated that while the term "local" is used to refer to systems being located at a facility of the entity that are not hosted on a cloud network, the present disclosure is not limited thereto. For example, local system 410 and its internal subsystems may or may not be physically on-premises at a facility of the entity, but rather, the internal subsystems can be located in areas that are not affiliated with the entity (e.g., rented servers). In addition, local system 410 can be used to run local applications that are managed by the entity.

In some implementations, cloud system 450 can be configured to store topology 455, templates, 460, deployment data 465, provisioning system 470, orchestration flow 475, and repository 480. For example, cloud system 450 may be a cloud network that is administered and operated by ORACLE. Repository 480 can include one or more storage systems for storing all of the deployment packages of incoming local applications that are being exported from local systems to cloud system 450. Further, repository 480 can store all versions of the local application that were created using the "clone-to-template" feature. Cloud system 450 can include one or more applications, systems or engines that are configured to manage one or more aspects of a cloud manager application. For example, a cloud manager administrator can operate or access the cloud manager application to manage operations of cloud system 450. Further, repository 480 can store the deployable and/or exportable versions of the local applications that have migrated from local system 410 to cloud system 450. The cloud manager application may be an application that provides deployment of applications environments in cloud system 450. For example, the cloud manager application can deploy PEOPLESOFT applications (e.g., human capital management (HCM), financial supply chain management (FSCM), etc.) on cloud system 450 in an automated way.

In some cases, the network administrators of local system 410 may seek to export their local applications to the cloud (e.g., to increase scalability of the local application, use the location application in a different environment, such as from a training environment to a production environment, and so on). Embodiments of the present disclosure enable the network administrators of the local system to export their local applications from the internal subsystems to the cloud system 450. In some cases, during the life cycle of an application, application administrators may migrate local applications to cloud system 450. During the migration process, application administrators can export the local application environment using deployment packages and import the deployment packages to cloud system 450. The cloud manager application can read the deployment packages of the local application and deploy the application on cloud system 450 using provisioning system 470.

In some cases, as part of ongoing development, an application administrator may make incremental changes to the migrated application (e.g., the local application after it has been exported from the local system to the cloud system) to update existing features or add new features and perform customizations, for example. In some implementations, the cloud manager application may enable self service groups to version (e.g., create different versions of an application) the local application with software changes, configuration changes (e.g., updating a version of the database server), deployment changes (e.g., changing a topology of the local application), and provide the local application in an exportable and/or deployable format to be shared amongst other user groups (e.g., developers).

In some implementations, the cloud manager application can enable users to create and deploy a distributed application on cloud system 450. For example, users can set up a cloud account associated with cloud system 450. Cloud accounts can enable users to access the functionality of the cloud manager application. Once an account is created, the user can perform various operations associated with the cloud manager application, including exporting local applications to cloud system 450, spawning new virtual machines, creating templates of the local application, and so on.

Further, once a local application has been exported to cloud system 450 (e.g., when the corresponding deployment packages of the local application have been stored in repository 480), users can create a template of the local application and associate one or more topologies to the template. For example, one topology may correspond to one environment (e.g., a development environment), and another topology may correspond to another environment (e.g., a production environment). A topology can be defined as different nodes of local application. For example, a topology may be defined by physical nodes and configuration settings, such as CPU, distribution of services, allocation of disk storage to virtual machines, networks, ports, and other suitable configuration settings. Further, applications can include or be executed on middle tiers, database servers, application servers, web servers, services, and so on. On cloud system 450, these systems may be distributed on any number of virtual machines and/or compute nodes. For example, a local application may be executed, such that the database server, the application server, and the web server each run on a single node (e.g., server), and after the local application is migrated to the cloud system 450, the local application may be configured to use a topology where each of the database server, application server, and the web server are executed on different nodes. Users can define configurations of each node (e.g., defining how many CPUs a database should run, defining web servers, defining storage space and speed, etc.). Once a topology has been defined, the topology can be associated with an environment template (as shown FIG. 7, for example). When a template has been defined for an application, the application can be distributed to other systems by creating one or more templates of the application and associating each of the one or more templates with a defined topology (not necessarily the same topology).

In some implementations, exporting a local application to cloud system 450 can include downloading a utility application (e.g., a .zip file that stores an export application) from cloud system 450 (e.g., from the cloud manager application). Once downloaded on local system 410, the utility application can be triggered. When triggered, the utility can be configured to receive input from users. For example, a user can point the utility to the local application environment (e.g., the user can identify a network location of database servers, application servers, and/or web servers of the local application). In other words, the utility application can discover the local environment to identify the underlying framework of the application. For example, the utility application can discover the network topology of the local application, the middleware data (e.g., version of the database server, operating system, application servers, and/or web servers). Once discovered, the utility application can store the discovered configuration settings (e.g., the network topology and the middleware data) in one or more deployment packages (e.g., .zip files) that store the discovered configuration settings in an exportable format. The deployment packages can be used to export the local application. As a non-limiting example, the deployment packages can include two .zip files; one including the configurations of the database server, and the other can include application-related configuration settings (e.g., middle tier data). The deployment packages may be used to transform the application into an exportable format. Further, the utility can upload the deployment packages to cloud system 450. Uploading the deployment packages can include storing the deployment packages in repository 480. The cloud manager application can be configured to create a new environment for the local application using the deployment packages. Advantageously, the local application may have been running on a single physical node when it was running in local system 410, but once exported to cloud system 450, the application can be deserialize and can run on different network topologies. In addition, as an advantage, the local application can be exported together with all of the customization configuration settings that existed before the application was exported.

In some implementations, the application can be serialized at local system 410 into an exportable format that handles customizations, including database servers and middle tiers, and then deserialized on the cloud system 450 so that the applications can be deployed on cloud system 450. In some implementations, a deployment package may be a self-contained unit that contains all of the configuration settings and middleware for the cloud system 450 to run an application. In addition, deployment packages can include application-layer customizations that were defined at the local system 410. As another example, deployment packages can include middleware configurations, databases, size of storage space in databases, middle tier storage, middle tier configurations, and so on. Further, in some implementations, deployment packages enable all of the configurations of the application to be represented in a single format.

In some implementations, provisioning the local application on cloud system 450 may be performed using several components. For example, the cloud manager application (not shown) may facilitate the provisioning of the local application on cloud system 450 using a defined topology 455, a particular template 460 of the local application, deployment data 465 (e.g., one or more deployment packages of the local application), a provisioning system 470, an orchestration process flow 475, and the repository 480. In some implementations, the provisioning system 470 may perform the steps of the orchestration flow in order to provision the local application on the cloud servers of the cloud system 450. For example, the orchestration flow evaluates the defined topology to determine an infrastructure to create for the application environment. In some examples, the provisioning system 470 may define the configuration settings of compute nodes (e.g., an amount of Random Access Memory (RAM) to allocate to one or more virtual machines) to deploy the local application on cloud system 450. The orchestration flow may begin by deploying the database server for the local application. Deploying the database server may include defining the configuration settings of the database server that will run the provisioned application. The next step in the orchestration flow performed by the provisioning system 470 may include configuring and deploying the middleware of the local application. For example, the middleware of the local application may be defined based on configurations provided by the user. Next, the defined middleware is connected with one or more cloud servers of the cloud system 450. The orchestration flow moves on to the next step where the Elasticsearch server is configured based on the defined middleware. The provisioning system 470 may perform the steps of the orchestration flow to provision the local application onto cloud servers of the cloud system 450.

It will be appreciated that after the local application is provisioned, the application environment may need to be updated over time (e.g., patches, bug fixes, new features, etc.). For example, there may be changes to the provisioned application and database binaries through database updates in terms of changes to tablespaces and data stored in the database. The updated application may be a new and updated version of the application environment when compared to the provisioned application that was previously deployed. The cloud system 450 can facilitate creating a new template from the updated version of the application environment (e.g., by performing the "clone-to-template" feature).

It will be appreciated that provisioning the application on cloud system 450 may include encapsulating the deployment package the local application needed to be deployed on the cloud. For example, defining the topology for the application environment may include specifying the distribution of nodes that run the database server, the application server, and the web server (e.g., whether the database server is run on a single node, the application server is run on a different node, and the web server is run on another node, or whether the database server, the application server, and the web server are each run on a single node). Defining the topology for the local application may also include specifying the RAM, the CPU, and the type of disk used to provision the local application on cloud system 450.

It will also be appreciated that once the local application is provisioned, users may make customizations to the provisioned application (e.g., change the data for the user's needs). The cloud manager application allows users to perform a process called "templatization," in which the cloud manager application captures the current topology of the provisioned application and the changes that were made to the application, including changes to the database server, the binary files, and customizations. The cloud manager clones the current topology with the updates and stores the cloned application as a new deployment package to be stored in the repository. Each new template is labeled as a version of the local application. Advantageously, developers can access individual templates and make further modifications to the individual templates for different uses (e.g., developers may make modifications to a template so that the application can be used in a training environment, developers may make modifications to another template so that the application can be used in a production environment, and so on). Each new template is stored in the repository as a version of the application. When modifications are made to a template, the modified template is serialized and stored as a deployment package in the repository.

Figure 5:
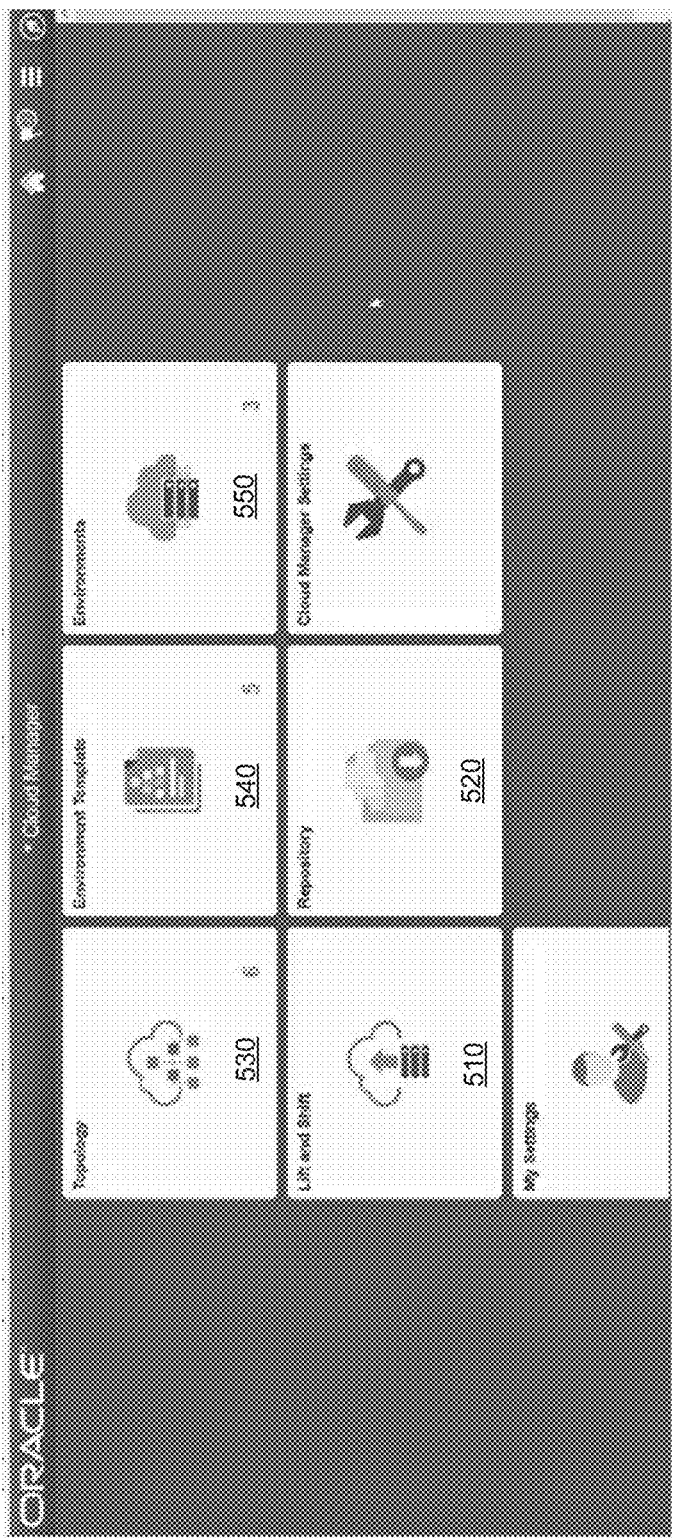
FIGS. 5-8 are example interfaces according to certain embodiments.

FIG. 5 is an interface illustrating an example of the cloud manager application. Interface 500 may be configured to present a plurality of selectable elements 510-550. While the selectable elements 510-550 of FIG. 5 are illustrated as tiles, it will be appreciated that the selectable elements may be presented in any shape or form. Additionally, each selectable element may be associated with a feature or function of the cloud manager application. For example, selectable element 510 corresponds to the "lift-and-shift" application described above. A user associated with a local system may access the cloud manager application using interface 500. In a scenario where the user seeks to export a local application to the cloud system associated with the cloud manager application, the user may select selectable element 510. Selectable element 510 may cause one or more additional interfaces that enable the user to download the utility application, which can discover the application environment and the corresponding configuration settings of its database server, application server, and/or web server.

It will be appreciated that the lift operation enables the configuration settings of the database server, application server, and web server of the local application to be automatically detected. In some cases, the database server may be detected as being an older version. In this situation, then the utility application automatically converts the database server to a current version (e.g., ORACLE DATABASE 12c) before performing the lift operation.

Selectable element 520 enables a user to access the various deployment packages stores in the repository of the cloud system. The repository can store the deployment packages of the local application (e.g., a base version of a local application) and the deployment packages of any template generated from the local application. In some implementations, the cloud manager application provides a way to subscribe to any number of channels, which are mapped to one or more application environments (e.g., an application pillar of PEOPLESOFT, such as Human Capital Management). A user can access the repository using selectable element 520 to subscribe to any of the available channels. Once subscribed, the cloud manager application periodically and automatically downloads download information (e.g., update images, bug fixes, entire images that can be deployed to get a demo instance, etc.) associated with the subscribed application from a data store. These packages are automatically downloaded and stored within cloud managers file server. There may be additional download information, such as Colbalt servers and Elasticsearch deployment packages.

Selectable element 530 enables the user to access the various topologies that have been defined within the cloud manager application. Examples of topologies may include Lift and Shift—DBaaS (e.g., Lift and Shift topology where database is deployed on Database as a Service), PUM Fulltier (e.g., Full-tier topology with one Linux node and one Windows Client), Lift and Shift (e.g., Default topology for Lift and Shift), FullTier (e.g., single virtual machine tier deployment), FullTier with Elastic Search (e.g., one FullTier instance with one Elastic Search instance), DBCS (e.g., Database Cloud Service, one compute instance for the middletier and one DBCS instance for the database server), Multi-MT-One-DB (e.g., multiple middletier instances with one database server instance), and other suitable topologies.

Selectable element 540 enables the user to access the previously-generated environment templates of a particular application that has been provisioned on the cloud system. Selectable element 550 enables the user to access the various environments previously defined within the cloud manager application.

Figure 6:
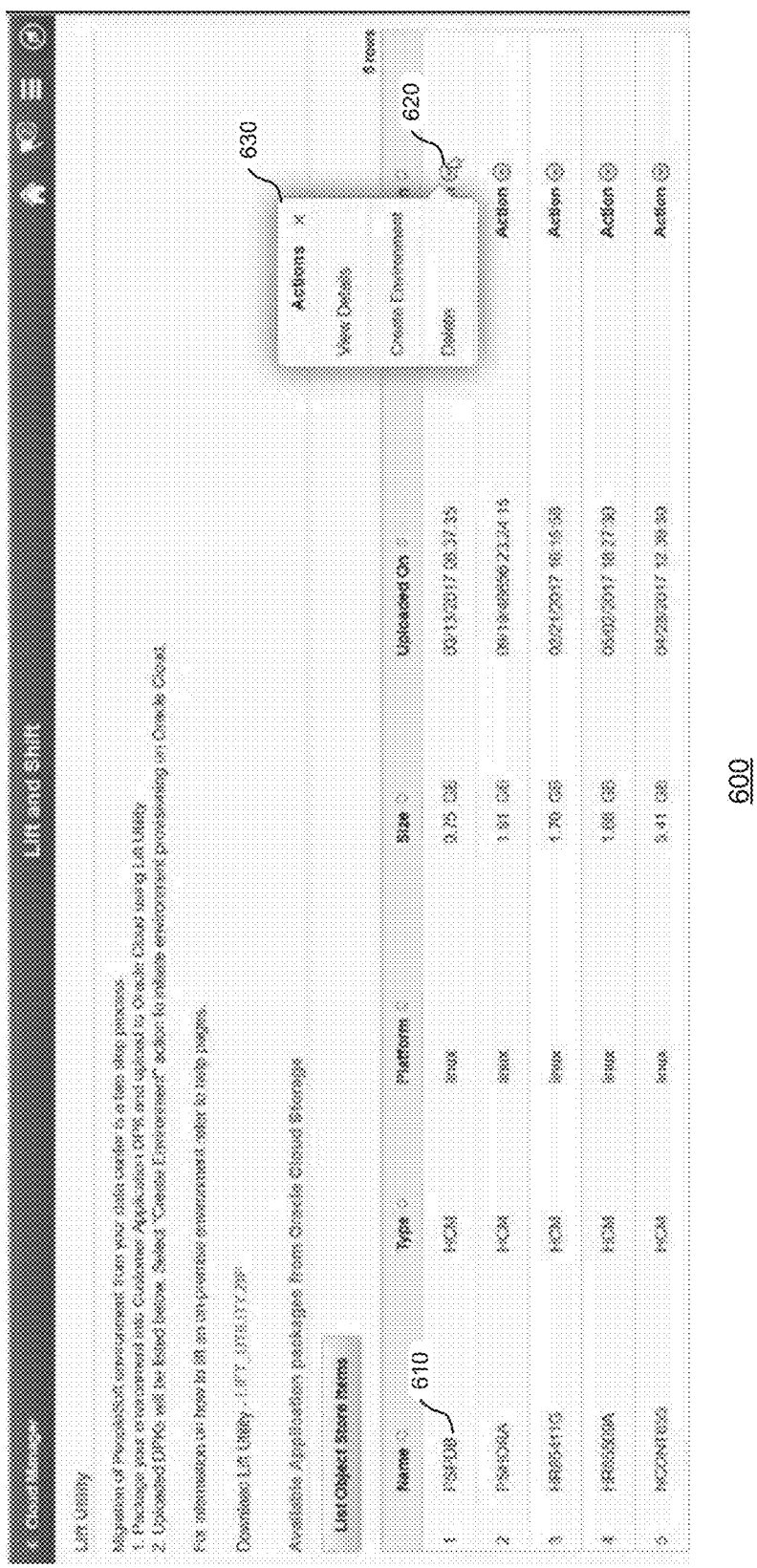

FIG. 6 is an example interface presented when selectable element 510 is selected in FIG. 5. For example, interface 600 lists the deployment packages of application that have been uploaded to the cloud system. In some cases, the uploaded deployment packages may be stored in a cloud storage system associated with the cloud manager application. In some cases, the uploaded deployment packages may be stored in the repository of the cloud system. In some cases, the templates of the application are stored in the repository.

As an example, interface 600 lists element 610 ("PSPBD") as a deployment package that has been uploaded from a local system. Interface 600 enables the user to perform one or more actions associated with the uploaded deployment packages. For example, actions 630 may be presented after button 620 is selected. Actions 630 may include "View Details," "Create Environment," and "Delete." If "Create Environment" is selected, the cloud manager application may initiate provisioning of the application on the cloud (e.g., using the orchestration flow).

Figure 7:
Figure 8:
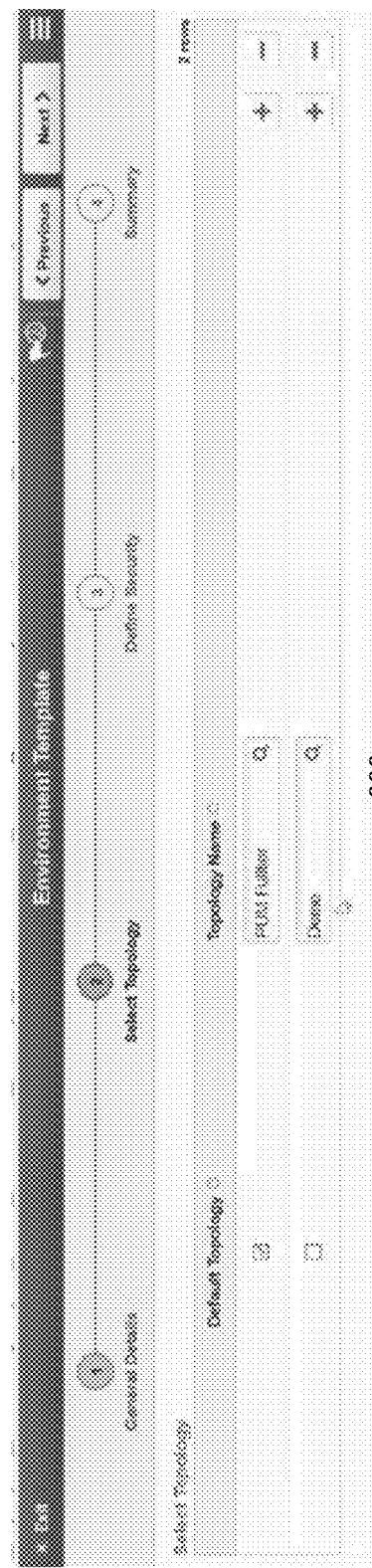

FIGS. 7 and 8 illustrate example interfaces presented when the user initiates creating a template of an application that has been uploaded to the cloud storage system or repository. For example, interface 700 enables the user to enter general details of the target template to be created. Interface 700 also enables the user to select the database server to associate with the template. For example, interface 700 illustrates that the PEOPLESOFT HCM server is selected as the database server to associate with the environment template. FIG. 8 illustrates an example interface for defining the topology to associate with a template. For example, interface 800 enables the user to select the topology that will be used to run the environment template. The example illustrated in FIG. 8 indicates that the user selected the "PUM (PEOPLESOFT Update Manager) Fulltier," which is a Full-tier topology with one Linux node and one Windows Client. Advantageously, the interfaces of the cloud manager application enable a highly-scalable and on-demand provisioning of applications on the cloud. Further, as an advantage, new versions of an existing application can be rapidly deployed to various destinations for further modification by developers.

Figure 9:
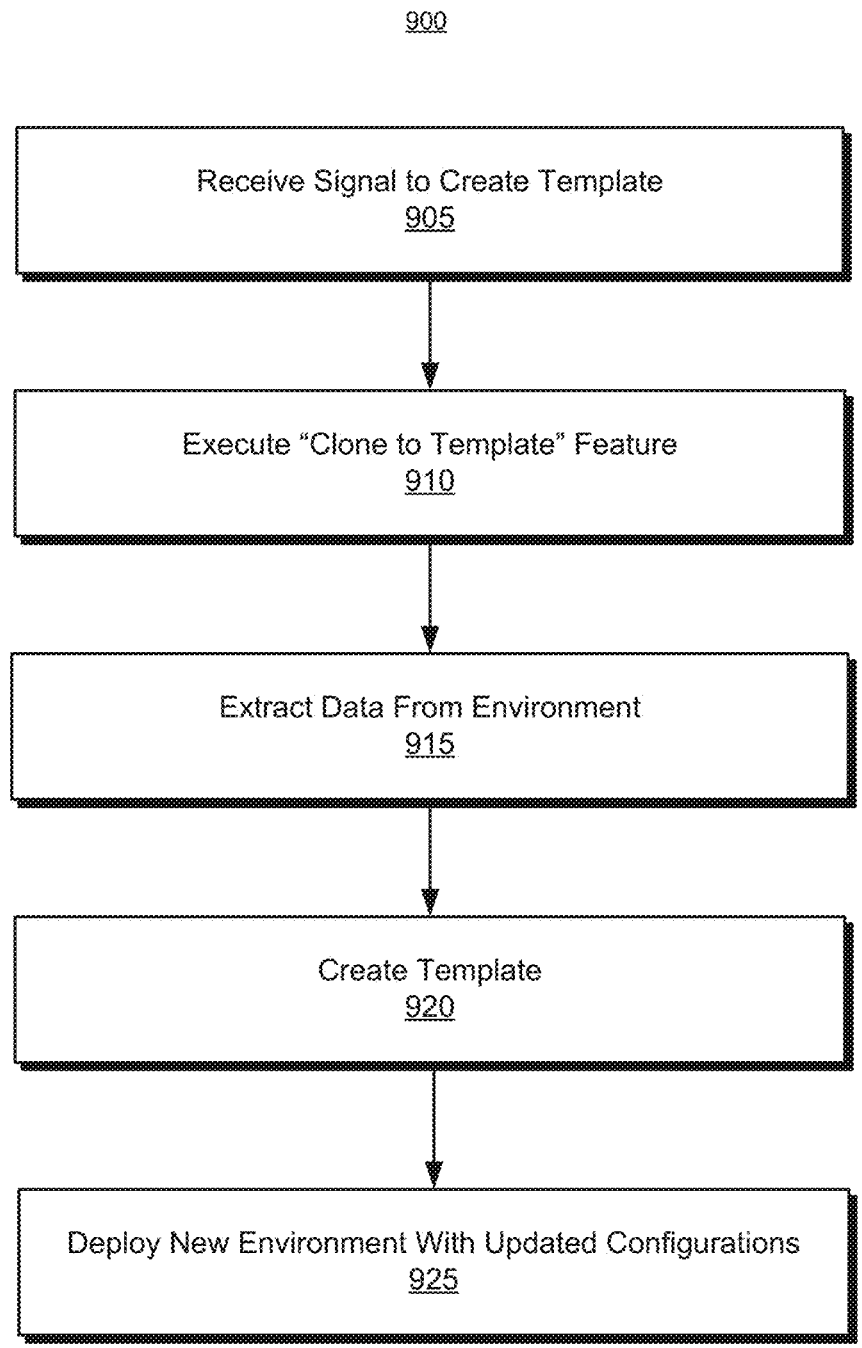
FIG. 9 is a flowchart illustrating a process for creating templates.

FIG. 9 is a flowchart illustrating an example process 900 for templatizing applications on the cloud. Process 900 can be performed at least in part by a log analytics system (e.g., log analytics system 101). Further, process 900 can be performed to enable users to update and modify existing applications on the cloud system. Process 900 beings at block 905 where the cloud system receives a signal from a user device to create a template. For example, once the on-premises application has been exported to the cloud system, users can create multiple versions of the application for updating and testing purposes. Templatizing an application can include creating an instance (e.g., a copy, a snapshot, etc.) of the application. The instance of the application can include all of the customization configurations that existed in the application and the network topology of the application. The cloud system can receive the signal from the user device, for example, via an interface presented on the user device. The interface can be presented to the user device when the user device accesses the cloud manager, for example. The cloud manager can include a selectable feature (e.g., a button, link, etc.) that can trigger the templatizing process.

At block 910, the "clone to template" feature can be executed in response to receiving the signal to templatize the application (received at block 905). In some implementations, a user can use the cloud manager to create a base application version in the form of a template that can be used to deploy an application environment. The base application version can include infrastructure layout details, such as number of virtual machines and the configuration settings of each virtual machine (e.g., define CPU, memory, disk, network, etc.). Further, the cloud manager can also capture initial software versions for the application server(s), web server(s), and database(s). The cloud manager can also capture the version details of the operating system, system configuration, and application configuration settings. In these implementations, the template can include all of the infrastructure and software requirements necessary to export, templatize, and/or deploy the application.

Using the base application version, a user can create and/or deploy an environment using the cloud system. The cloud system can facilitate deploying environments by automating the provisioning and configuration of the environments using the details in the initial template (e.g., base application version).

After the environment of the base application version is created, the environment gets provisioned as defined in the template (e.g., the base application version). As part of the lifecycle of the application, the environment may need to be updated or modified over time. For example, there may be changes to the installed application through database updates in terms of changes to table spaces and data in the database. The modifications to the environment become a new and updated version of the environment when compared to the base environment that was deployed using the initial template (e.g., the base application version). The cloud manager can create a new template from the updated version of the environment. Creating the new template can be achieved by executing the "cloud to template" feature.

Executing the "clone to template" feature on the new version of the environment can include automatically (via the cloud manager) determining the required details to create a new template version. For example, at block 915, the cloud manager can automatically extract at least (or any combination of) the following data points from the new version of the environment: (1) New versions of the application binaries for the application servers, web servers, and databases; (2) Updated configuration of the application servers, web servers, and databases; (3) New customization configurations stored in the application server; and (4) data files stored in the databases. At block 920, the new template can be created and stored in the cloud system. The new template can include all of the infrastructure, security information, software, and configuration details necessary to deploy the application.

At block 925, the new template can be deployed. For example, the new template for the new version of the environment (e.g., that includes the updates and modifications) can be used to deploy the new template with the updated configuration settings using the cloud manager. Thus, versioned environments can be provided to users by provisioning updated templates.

It will be appreciated that the new template may have distributed parts (e.g., distributed databases, middle tiers, middleware data, etc.). It will also be appreciated that the repository 480 can store all of the binary runs of the cloud system applications (e.g., PEOPLESOFT). Further, the repository can store locations of the deployment packages for each of the applications that migrated to the cloud system. It will also be appreciated that users can apply new features to existing environments of the application by templatizing the environments. For example, templatizing can include exporting the application in a deployable format, and creating multiple versions of the application, while still capturing the application-layer customizations defined in the configuration settings of the application. It will also be appreciated that templatizing can include capturing snapshot of a state of an application at a given time. The snapshot includes the application data and the customized configuration settings representing the changes made to the configuration of the system. Further, the snapshot can include the network topology of how the environment is distributed (e.g., how many databases, application servers, and web servers are being used and their corresponding configurations). Advantageously, the multiple versions of the application may be maintained in the cloud system and tied to different or user-defined topologies without losing any application-layer customizations included in the application.

Figure 10:
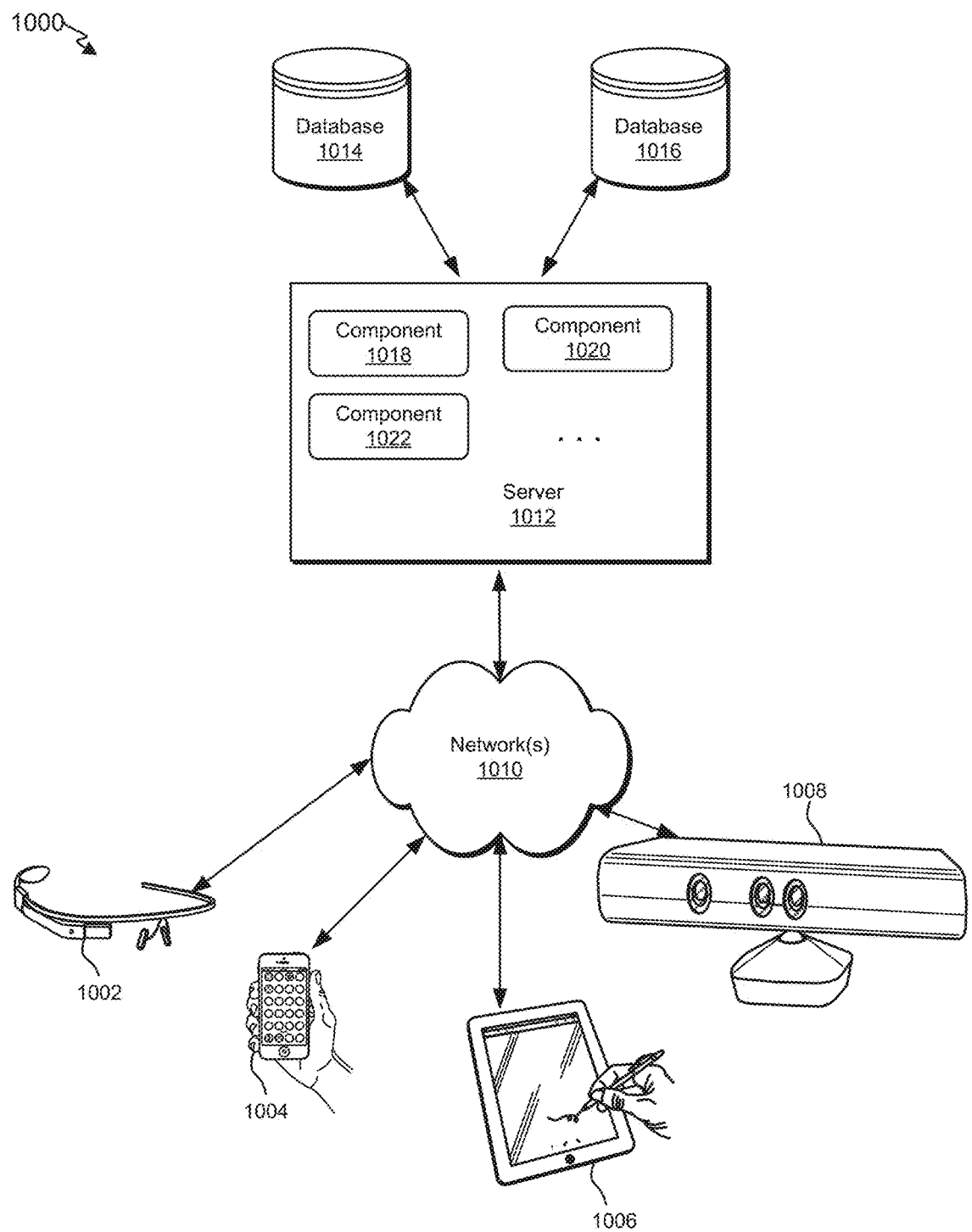
FIG. 10 is a simplified diagram illustrating a distributed system for implementing one of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
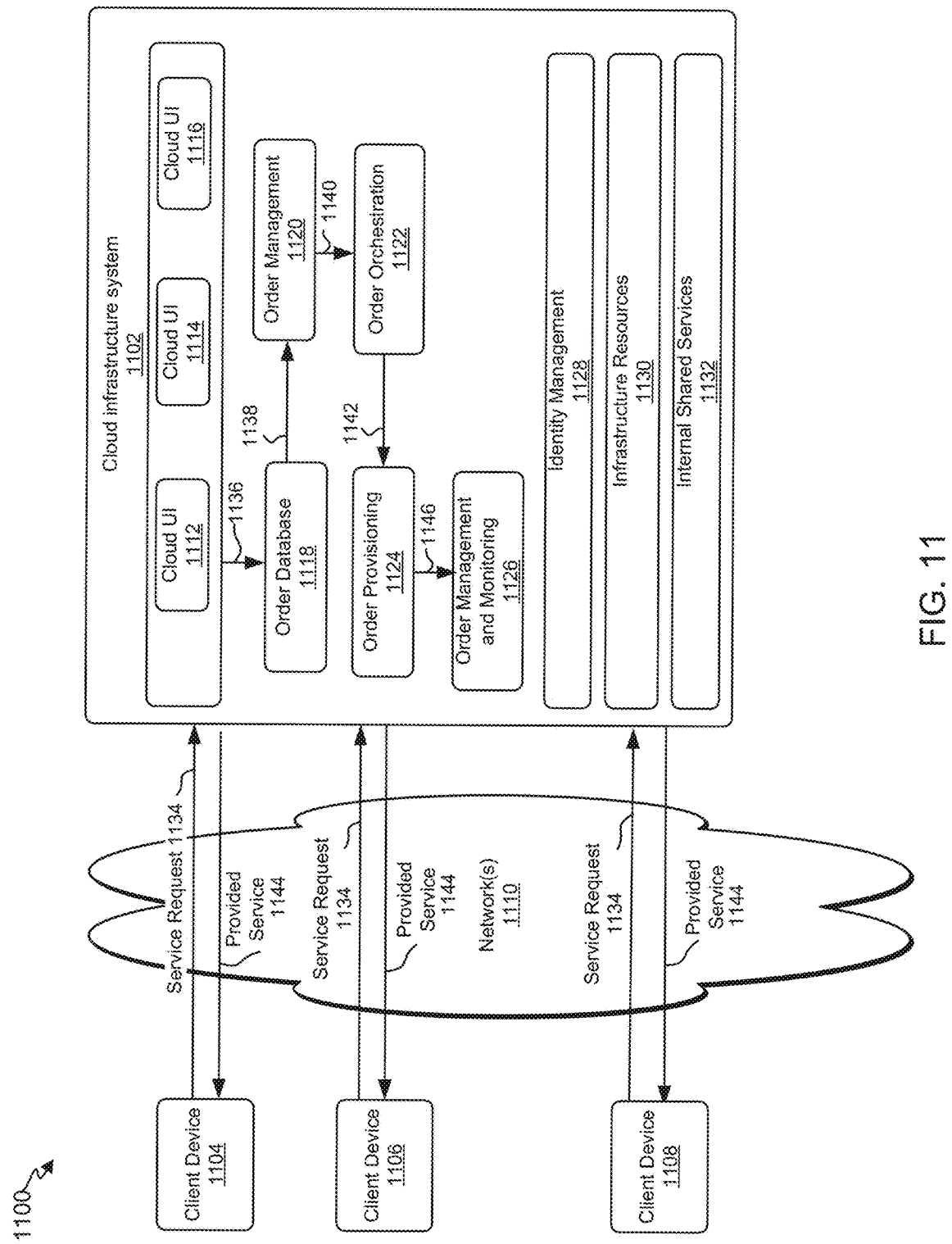
FIG. 11 is a simplified block diagram illustrating one or more components of a system environment.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 802 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
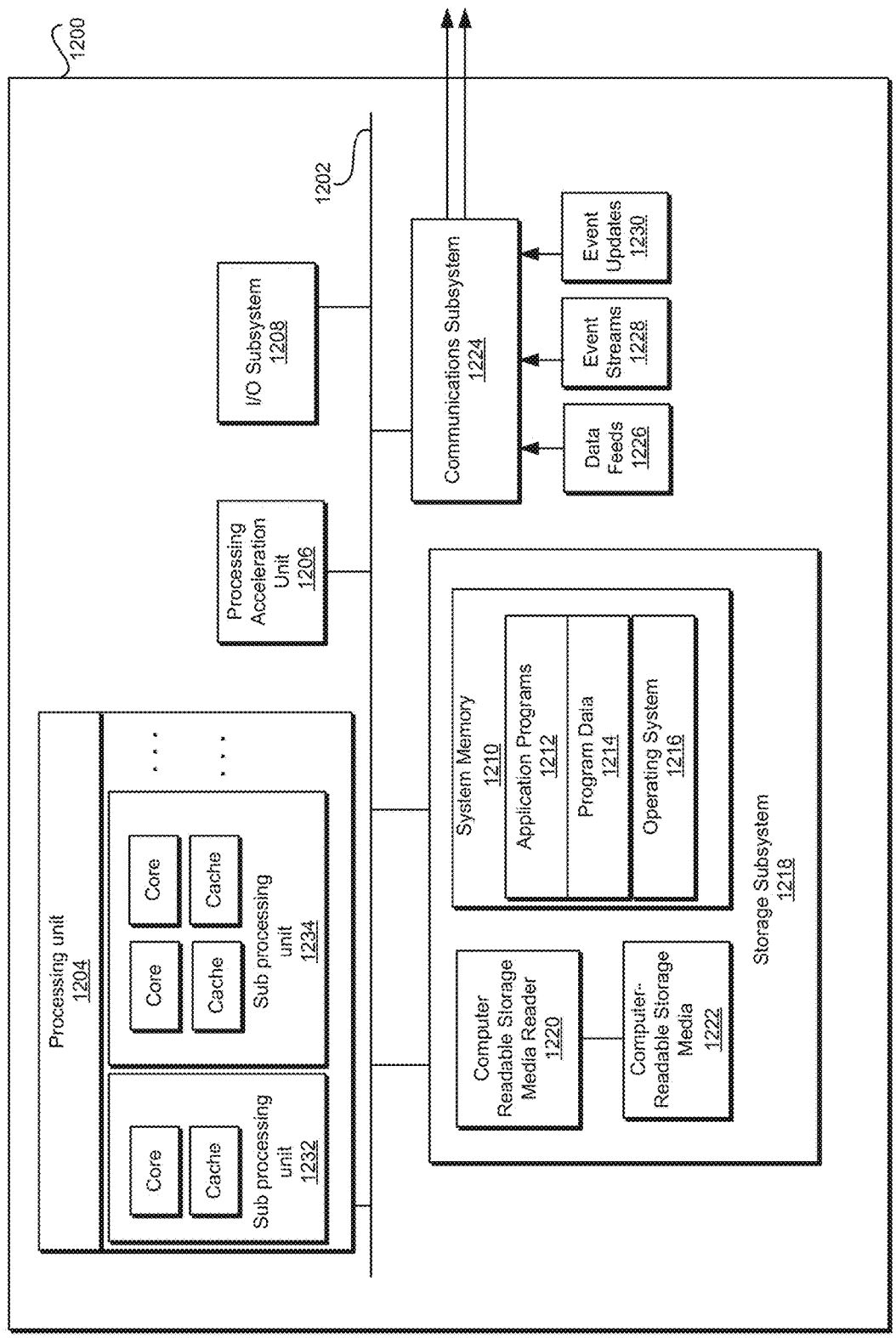
FIG. 12 illustrates an exemplary computer system, in which various embodiments of the present invention may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 8112 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 924 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   receiving, at a cloud system, a request for an export application from a local server, the local server storing a local application, the export application being configured to export the local application to the cloud system, and the local application being defined by one or more configuration settings stored at the local server;
   transmitting the export application to the local server, wherein the export application is configured to execute on the local server to extract the local application, and execution of the export application includes:
      automatically discovering application data stored at the local server, the application data characterizing at least a network architecture of the local application, wherein the application data includes at least the one or more configuration settings that define the local application, and
      transforming the application data into exportable deployment data that includes a configuration file with metadata representing the local application, the exportable deployment data being in a defined format, and the transforming including serializing the local application into an exportable deployment data in the defined format;
   receiving, at the cloud system and from the local server, the exportable deployment data;
   defining a new environment for the local application in the cloud system, the new environment being defined using the one or more configuration settings included in the exportable deployment data, and the new environment being configured to provision the local application on the cloud system; and
   generating one or more templates of the new environment, each template of the one or more templates being a deployable version of the local application, and each of the one or more templates being separately modifiable to include one or more modifications to the one or more configuration settings of the local application.

2. The computer-implemented method of claim 1, wherein the one or more configuration settings are any one or more of a topology associated with the local application and one or more application-layer customization settings defined at the local server.

3. The computer-implemented method of claim 1, further comprising:
   identifying, at the cloud system, one or more new features, each of the one or more new features being configured to add a new feature to the local application;
   identifying a template of the one or more templates of the new environment;
   updating the template to include the one or more new features; and
   deploying the updated template at the cloud system.

4. The computer-implemented method of claim 1, wherein the one or more configuration settings are any one or more of: binary source code of the local application; one or more binary changes to the local application, customizations, or database changes; middleware data of the local application representing at least a version of a database, an application server, or a web server that execute the local application; operating system images of the local application; system configurations associated with the local application; and a deployment topology associated with the local application.

5. The computer-implemented method of claim 1, wherein generating the one or more templates includes generating each of a first template and a second template of the local application, wherein the first template is defined by a first topology for a first application environment, wherein the second template is defined by a second topology for a second application environment, and wherein the first topology is different than the second topology.

6. The computer-implemented method of claim 1, wherein generating the one or more templates includes performing a clone-to-template feature that includes:
   generating a clone of the local application, wherein the clone of the local application includes the one or more configuration settings of the local application;
   transforming the clone of the local application into the defined format;
   labeling the clone of the local application with a unique identifier; and
   storing the clone of the local application in a repository, wherein the clone of the local application is stored in association with the unique identifier.

7. The computer-implemented method of claim 1, wherein the local application is associated with a database server, wherein when a version of the database server does not match a predefined version, the export application automatically converts the version of the database server into another version to export the local application to the cloud system.

8. A system, comprising:
one or more data processors; and
a non-transitory computer-readable storage medium containing instructions which, when executed on the one or more data processors, cause the one or more data processors to perform operations including:
receiving, at a cloud system, a request for an export application from a local server, the local server storing a local application, the export application being configured to export the local application to the cloud system, and the local application being defined by one or more configuration settings stored at the local server;
transmitting the export application to the local server, wherein the export application is configured to execute on the local server to extract the local application, and execution of the export application includes:
automatically discovering application data stored at the local server, the application data characterizing at least a network architecture of the local application, wherein the application data includes at least the one or more configuration settings that define the local application, and
transforming the application data into exportable deployment data that includes a configuration file with metadata representing the local application, the exportable deployment data being in a defined format, and the transforming including serializing the local application into an exportable deployment data in the defined format;
receiving, at the cloud system and from the local server, the exportable deployment data;
defining a new environment for the local application in the cloud system, the new environment being defined using the one or more configuration settings included in the exportable deployment data, and the new environment being configured to provision the local application on the cloud system; and
generating one or more templates of the new environment, each template of the one or more templates being a deployable version of the local application, and each of the one or more templates being separately modifiable to include one or more modifications to the one or more configuration settings of the local application.

9. The system of claim 8, wherein the one or more configuration settings are any one or more of a topology associated with the local application and one or more application-layer customization settings defined at the local server.

10. The system of claim 8, wherein the operations further comprise:
identifying, at the cloud system, one or more new features, each of the one or more new features being configured to add a new feature to the local application;
identifying a template of the one or more templates of the new environment;
updating the template to include the one or more new features; and
deploying the updated template at the cloud system.

11. The system of claim 8, wherein the one or more configuration settings are any one or more of: binary source code of the local application; one or more binary changes to the local application, customizations, or database changes; middleware data of the local application representing at least a version of a database, an application server, or a web server that execute the local application; operating system images of the local application; system configurations associated with the local application; and a deployment topology associated with the local application.

12. The system of claim 8, wherein generating the one or more templates includes generating each of a first template and a second template of the local application, wherein the first template is defined by a first topology for a first application environment, wherein the second template is defined by a second topology for a second application environment, and wherein the first topology is different than the second topology.

13. The system of claim 8, wherein generating the one or more templates includes performing a clone-to-template feature that includes:
generating a clone of the local application, wherein the clone of the local application includes the one or more configuration settings of the local application;
transforming the clone of the local application into the defined format;
labeling the clone of the local application with a unique identifier; and
storing the clone of the local application in a repository, wherein the clone of the local application is stored in association with the unique identifier.

14. The system of claim 8, wherein the local application is associated with a database server, wherein when a version of the database server does not match a predefined version, the export application automatically converts the version of the database server into another version to export the local application to the cloud system.

15. A computer-program product tangibly embodied in a non-transitory machine-readable storage medium, including instructions configured to cause a data processing apparatus to perform operations including:
receiving, at a cloud system, a request for an export application from a local server, the local server storing a local application, the export application being configured to export the local application to the cloud system, and the local application being defined by one or more configuration settings stored at the local server;
transmitting the export application to the local server, wherein the export application is configured to execute on the local server to extract the local application, and execution of the export application includes:
automatically discovering application data stored at the local server, the application data characterizing at least a network architecture of the local application, wherein the application data includes at least the one or more configuration settings that define the local application, and
transforming the application data into exportable deployment data that includes a configuration file with metadata representing the local application, the exportable deployment data being in a defined format, and the transforming including serializing the local application into an exportable deployment data in the defined format;
receiving, at the cloud system and from the local server, the exportable deployment data;

defining a new environment for the local application in the cloud system, the new environment being defined using the one or more configuration settings included in the exportable deployment data, and the new environment being configured to provision the local application on the cloud system; and generating one or more templates of the new environment, each template of the one or more templates being a deployable version of the local application, and each of the one or more templates being separately modifiable to include one or more modifications to the one or more configuration settings of the local application.

16. The computer-program product of claim 15, wherein the one or more configuration settings are any one or more of a topology associated with the local application and one or more application-layer customization settings defined at the local server.

17. The computer-program product of claim 15, further comprising: identifying, at the cloud system, one or more new features, each of the one or more new features being configured to add a new feature to the local application; identifying a template of templates of the new environment; updating the template to include the one or more new features; and deploying the updated template at the cloud system.

18. The computer-program product of claim 15, wherein the one or more configuration settings are any one or more of: binary source code of the local application; one or more binary changes to the local application, customizations, or database changes; middleware data of the local application representing at least a version of a database, an application server, or a web server that execute the local application; operating system images of the local application; system configurations associated with the local application; and a deployment topology associated with the local application.

19. The computer-program product of claim 15, wherein generating the one or more templates includes generating each of a first template and a second template of the local application, wherein the first template is defined by a first topology for a first application environment, wherein the second template is defined by a second topology for a second application environment, and wherein the first topology is different than the second topology.

20. The computer-program product of claim 15, wherein generating the one or more templates includes performing a clone-to-template feature that includes:

generating a clone of the local application, wherein the clone of the local application includes the one or more configuration settings of the local application;

transforming the clone of the local application into the defined format;

labeling the clone of the local application with a unique identifier; and storing the clone of the local application in a repository, wherein the clone of the local application is stored in association with the unique identifier.

\* \* \* \* \*